Oct. 17, 1933.　　　E. A. KENT ET AL　　　1,930,937

CHERRY PITTING MACHINE

Filed Aug. 13, 1928

Inventors
Edward Angle Kent
Anton Bava
Bert C. Youman
By Lyon & Lyon
Attorney

Patented Oct. 17, 1933

1,930,937

UNITED STATES PATENT OFFICE 1,930,937

CHERRY PITTING MACHINE

Edward Angle Kent, Berkeley, Anton Bava and Bert C. Youman, San Francisco, Calif., assignors to California Packing Corporation, San Francisco, Calif., a corporation of New York Application August 13, 1928. Serial No. 299,206

7 Claims. (Cl. 146—18)

This invention relates to cherry pitting machines and is more particularly related to a device adapted for the automatic and continuous pitting of cherries as the same are fed onto a conveyor.

An object of this invention is to provide a device for removing the pits, or stones from cherries in an automatic, continuous manner while causing a minimum of mutilation to the flesh of the cherries, and also resulting in the removal of a minimum of the flesh of the cherries with the pits or stones.

Another object of this invention is to provide a means for removing the pits or stones from cherries which includes a pair of complementary curved tongs having sharpened edges which are adapted to be thrust through the flesh of the fruit, preferably through the stem end thereof, and which will conform to the curvature of the pit, or stone of the cherry, and which when withdrawn from the flesh of the fruit will remove the pit from the fruit.

Another object of this invention is to provide a cherry pitting means which includes means adapted to be thrust into the flesh of the fruit and which, when withdrawn, will draw the pit or stone from the fruit, and means adapted to be actuated in timed relation with the pitting means for ejecting the pit or stone as withdrawn from the flesh of the fruit from the pitting means.

Other objects and advantages of this invention it is believed will be apparent from the following detailed description of a preferred embodiment thereof as illustrated in the accompanying drawing.

Figure 1:
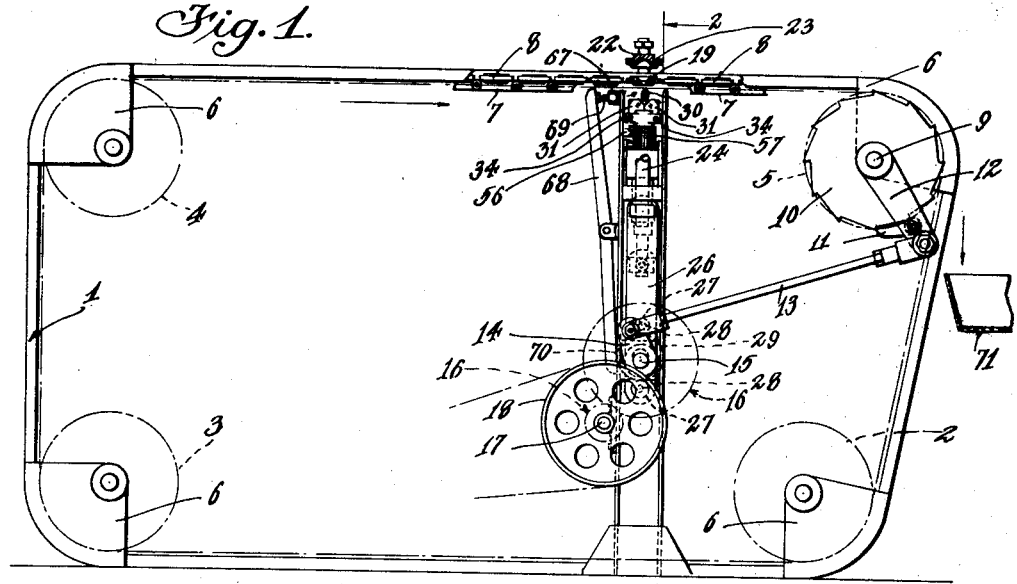
Figure 1 is a side elevation, partly in section, of a cherry pitting machine embodying this invention.
Figure 3:
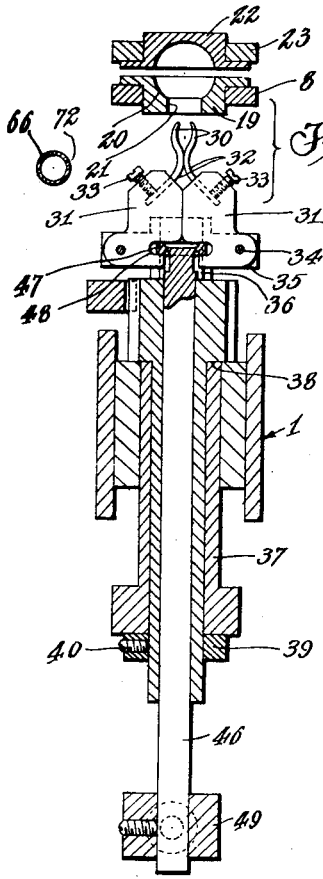
Figure 3 is an enlarged sectional side elevation taken substantially in the line 3—3 of Figure 2.
Figure 2:
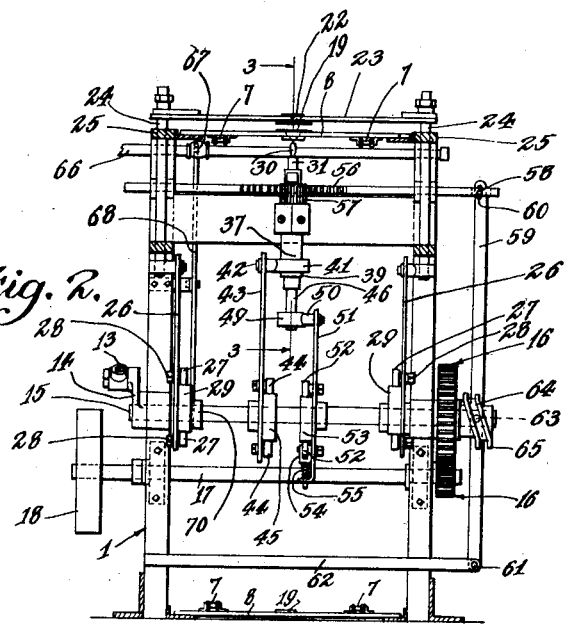
Figure 2 is an end sectional elevation taken substantially on the line 2—2 of Figure 1.

In the preferred embodiment of this invention illustrated in the accompanying drawing, 1 indicates a frame on which spaced sprockets 2, 3, 4 and 5 are supported by means of brackets 6. Two transversely spaced sets of sprockets, 2, 3, 4 and 5, are preferably provided to engage the links 7 with continuous chains which are passed over the said sprockets. Each link 7 of the chain is provided with a conveyor in the form of a slat draper 8 which is connected across the two chains to the corresponding links 7 thereof. The sprockets 2, 3 and 4 are merely idler sprockets, while the sprocket 5 is an intermittent drive sprocket by means of which the chains are driven to intermittently move the slat drapers 8 along. The sprockets 5 are secured to the shaft 9 which extends transversely of the frame structure. Secured to the shaft 9 is a ratchet wheel 10 which is adapted to be engaged by a pawl 11 carried by a link 12. The pawl 11 is urged toward contacting position by means of a spring (not shown) but the use of which is well understood in the art.

The link 12 is connected by a connecting rod 13 with a crank 14. The crank 14 is secured to a shaft 15 which is supported in bearings by the frame 1. The shaft 15 is driven through the gears 16 from a shaft 17. The shaft 17 is driven by means of a pulley 18, or other drive wheel, from any suitable form of prime mover.

The draper slats 8 are provided with cups 19 which are formed with substantially semi-spherical pockets 20 having vertical bores 21 at their lower ends. A cup 22 is supported above the conveyor provided by the draper slats 8 in the pitting position, and the cup 22 is carried by a cross-arm 23. The cross-arm 23 is secured at its opposite ends to guide rods 24, which extend through guide members 25 of the frame 1. The rods 24 at their lower end are secured to actuating arms 26. The actuating arms 26 are journaled on the shaft 15 and carry spaced apart cam rollers 27 on pins 28. Secured to the shaft 15 are cams 29 which are engaged by the cam rollers 27 and actuate the actuating arms 26 to raise and lower the cross-bar 23, and hence the cup 22, to and from position to clamp the cherries or fruit between the cups 20 and 22 as the conveyor provided by the draper slats 8 comes to rest in the pitting position.

Means are provided for pitting the cherries or other fruit as the same is clamped between the cups 20 and 22, which means preferably comprises a pair of complementary arcuate pitting tongs, or spoons, 30 which are provided with sharpened edges and points. The arcuate pitting tongs are secured to links 31 by passing their shanks 32 through slots formed in the links 31 and clamping the shanks 32 in position by means of set screws 33. The links 31 are pivotally secured by pins 34 to ears 35 formed integral with the sleeve 36. The sleeve 36 is journaled in a bearing sleeve secured to an elongated collar 37. The upper end of the collar 37 engages the shoulder 38 formed on the sleeve 36, and the lower end of the collar 37 engages a washer 39 which is secured to the sleeve 36 by means of a set screw 40. The collar 37 is rigidly secured to the sleeve 36 and is secured to a clamp 41, and the clamp 41 is in turn pivotally secured at a pin 42 to an actuating link 43. The actuating link 43 is journaled on the shaft 15 and carries spaced cam rollers 44. Secured to the shaft 15, in position to engage the spaced cam rollers 44 is a cam 45, which acts to reciprocate the link 43, and hence the sleeve 36. The reciprocation of the sleeve 36 results in the pivoting of the links 31 apart to spread the pitting tongs 30. The opening apart of the pitting tongs takes place after the pitting tongs have been inserted through the hole 21 in the lower cup 20, and just after the pitting tongs have entered slightly into the cherry or fruit to permit the tongs 30 to pass around the pit.

The tongs are then closed around the pit by actuation of the plunger 46, which is concentrically mounted within the sleeve 36 and is provided with a head 47 which fits within the cut-out recess 48 formed in the links 31. The plunger 46 is provided at its lower end with a collar 49 which is provided with an outwardly extending boss 50. Pivotally secured to the boss 50 is an actuating link 51 which is likewise journaled on the shaft 15 and provided with spaced apart cam rollers 52 between which a cam 53, which is secured to the shaft 15, is mounted. One of the cam rollers 52 is carried by a slide 54 which is yieldably urged by means of a spring 55 into operative position so as to permit a yielding in the thrust imparted to the plunger 46 to close the pitting tongs 30 in case the pitting tongs 30 have not passed completely around the pit of the cherry or fruit, and also so as to yieldably urge the pitting tongs 30 into firm contact with the pit of the cherry or fruit.

Means are provided for rotating the pitting tongs 30 after they have been clamped around the pit of the cherry or fruit, which means preferably comprises a rack 56, which is slidably mounted transversely of the frame 1 in position to mesh with a gear 57 which is formed integral with the sleeve 36. The rack 56 is pivotally secured at a pin 58 to an actuating crank 59. The pin 58 is mounted in a slot 60 formed in the crank 59. The crank 59 is pivoted at its opposite end at a pin 61 to a transversely extending bar 62.

Intermediate its length the crank 59 carries a cam roller 63 which rides in a camway 64 formed by the cam wheel 65. The cam wheel 65 is secured to and driven by the shaft 15.

The rotation of the pitting tongs 30 is preferably only through approximately one-half revolution so that the pit of the cherry is cut and torn loose. After the pitting knives have been rotated through a half revolution, they are then retracted from within the cups 20 and 22 by actuation of the cams 45 and 53, and the pitting knives 30 are again spread apart and returned to their starting position by the rack 56 rotating the same through the gear 57. The knives 30 are spread apart by reciprocation of the link 43 due to the cam 45. Means are then thrown into operation for jetting a blast of compressed air through the pitting tongs 32 to blow the pit from between the knives 30. The operation of this pit ejecting means is:

A pipe 66 extends transversely of the frame 1 adjacent the pitting knives 30 and is connected with any suitable or desirable source of compressed air. Mounted in the pipe 66 is a valve indicated at 67. Fulcrumed on the frame 1 is an arm 68 which is adapted to engage the stem 69 of the valve 67 at one end and at its opposite end engages a cam 70 which intermittently actuates the fulcrumed arm 68 in timed relation with the opening apart of the spoons 30 to cause the arm 68 to actuate the valve stems 69 of the valve 67 and permit a blast of air to be blown through the jet opening 72 formed in the pipe 66, and hence blow the pit from between the arcuate pitting spoons or tongs 30.

After the cherry or fruit has been pitted, the cup 22 is lifted and the conveyor formed by the draper slat 8 is driven forward to move the next cherry into position to be pitted. The meat of the fruit or cherries is finally dumped from the conveyor provided by the draper slats 8 into a receiving container or pan 71 as the holding cups pass over the sprockets 5. It will be obvious that a plurality of pitting means and holding cups might be formed or positioned longitudinally of the draper slats 8 in order to provide a multiple pitting machine which would pit a plurality of cherries or fruit in a single operation.

Having fully described our invention, it is to be understood that we do not wish to be limited to the details herein set forth, but our invention is of the full scope of the appended claims:

We claim:

1. In a device of the class described, the combination of a frame, a conveyor, means for supporting the conveyor on the frame, means for driving the conveyor, fruit cups on the conveyor, pitting tongs supported in position below the conveyor, means for clamping the fruit in the fruit cups, means for thrusting the tongs through an opening formed in the fruit cups, for spreading the tongs around the pit of the fruit and for rotating the tongs through an arc to shear the pit from the fruit, and means for drawing the tongs from the fruit with the pit of the fruit carried between the tongs.

2. In a device of the class described, the combination of a frame, a conveyor, means for supporting the conveyor on the frame, means for driving the conveyor, fruit cups on the conveyor, pitting tongs supported in position below the conveyor, means for clamping the fruit in the fruit cups, means for thrusting the tongs through an opening formed in the fruit cups, for spreading the tongs around the pit of the fruit and for rotating the tongs through an arc to shear the pit from the fruit, means for drawing the tongs from the fruit with the pit of the fruit carried between the tongs, and means for ejecting the pit from between said tongs.

3. In a device of the class described, the combination of a frame, a conveyor, means for supporting the conveyor on the frame, means for driving the conveyor, fruit cups on the conveyor, pitting tongs supported in position below the conveyor, means for clamping the fruit in the fruit cups, means for thrusting the tongs through an opening formed in the fruit cups, for spreading the tongs around the pit of the fruit and for rotating the tongs through an arc to shear the pit from the fruit, means for drawing the tongs from the fruit with the pit of the fruit carried between the tongs, and means for jetting air under pressure between the tongs in timed relation with the operation of the tongs to blow the pit from between the tongs.

4. In a device of the class described, the combination of a frame, a conveyor, means for supporting the conveyor on the frame, means for driving the conveyor, fruit cups on the conveyor, pitting tongs supported in position below the conveyor, means for clamping the fruit in the fruit cups, means for thrusting the tongs through an opening formed in the fruit cups, for spreading the tongs around the pit of the fruit and for rotating the tongs through an arc to shear the pit from the fruit, means for drawing the tongs from the fruit with the pit of the fruit carried between the tongs, means for spreading the tongs apart to free the pit of the fruit, and means for directing a blast of air between the tongs to blow the pit from between the tongs.

5. In a device of the class described, the combination of a fruit holding cup having an opening in the bottom, of pitting tongs, means for simultaneously imparting longitudinal and rotary motion to said pitting tongs to force the tongs through said opening into the fruit around the pit to sever the pit from the flesh of the fruit, means for retracting the tongs from the flesh of the fruit, means for actuating the tongs to draw the pit from the flesh of the fruit as the tongs are retracted, and means for spreading said tongs to free the pit to permit the same to be ejected from between said tongs.

6. In a device of the class described, the combination of pitting tongs, means for simultaneously imparting longitudinal and rotary motion to said pitting tongs thereby forcing the tongs into the fruit around the pit and severing the pit from the flesh of the fruit, means for actuating the tongs to close the same around the pit, means for retracting the tongs from the flesh of the fruit to draw the pit therefrom, means for spreading said tongs to free the pit to permit the same to be ejected from between said tongs, and means for jetting air under pressure between said tongs to blow the pit from between the tongs.

7. A cherry pitting device including a conveyor having a plurality of cherry receiving cups, means for imparting an intermittent motion to said conveyor, means mounted over the conveyor for engaging the cherries at one end to clamp the cherries one in each of said cups when the conveyor is at rest, pitting members, means for thrusting the pitting members through the flesh of the cherries at the ends opposite the clamping means while the conveyor is at rest, means for actuating the pitting members to grip the pits of the cherries, and means for retracting the pitting members to draw the pits from the cherries.

EDWARD ANGLE KENT.
ANTON BAVA.
BERT C. YOUMAN.